United States Patent [19]
Woods et al.

[11] 3,813,509
[45] May 28, 1974

[54] SYSTEM FOR INTERNAL-COMBUSTION ENGINE VALVE PRODUCTION

[75] Inventors: Marion D. Woods; Albert J. Zvanut, both of Whittier, Calif.

[73] Assignee: Stoody Company, Whittier, Calif.

[22] Filed: July 2, 1973

[21] Appl. No.: 376,060

Related U.S. Application Data

[63] Continuation-in-part of Ser. No. 295,751, Oct. 6, 1972, Pat. No. 3,743,815.

[52] U.S. Cl.................... 219/76, 219/146, 219/161
[51] Int. Cl................................................. B23k 9/04
[58] Field of Search....... 219/76, 77, 158, 161, 136, 219/137, 145, 146, 159

[56] References Cited
UNITED STATES PATENTS

| | | | |
|---|---|---|---|
| 3,239,644 | 3/1966 | Nyborg et al.................. | 219/161 X |
| 3,453,409 | 7/1969 | Schaber............................... | 219/76 |
| 3,504,148 | 3/1970 | Maximovich et al............. | 219/76 X |
| 3,534,390 | 10/1970 | Woods et al....................... | 219/146 |
| 3,539,765 | 11/1970 | Dutteva et al..................... | 219/146 |

*Primary Examiner*—Bruce A. Reynolds
*Attorney, Agent, or Firm*—Nilsson, Robbins & Berliner

[57] ABSTRACT

A system is disclosed for use in the production of valves that include a disk or head which is integral with an axially-extending shank or stem. As disclosed herein, a form or blank of such a valve initially is provided (as by various metal-forming techniques) with an annular groove at the peripheral edge of the head. The valve form is then placed in a chuck to provide electrical contact with substantially the entire periphery of the valve head thereby affording a locus of short paths for heat flow and an arc-welding electrical current. In accordance herewith, the valve is then rotated in relation to an arc-welding apparatus to deposit an annulus of a specific form of hard metal in the groove of the valve. Finally, the valve is finished by smoothing the deposited annulus to provide a seating surface that will matingly engage an engine port to accomplish closure.

7 Claims, 7 Drawing Figures

PATENTED MAY 28 1974 3,813,509

SYSTEM FOR INTERNAL-COMBUSTION ENGINE VALVE PRODUCTION

This is a continuation-in-part of Ser. No. 295,751, filed Oct. 6, 1972, now U.S. Pat. No. 3,743,815, entitled "SYSTEM FOR PRODUCING VALVES AS FOR INTERNAL-COMBUSTION ENGINES."

BACKGROUND AND SUMMARY OF THE INVENTION

The performance of a conventional internal-combustion, automotive engine is significantly related to the effective operation of its valves. Generally, the operating rate of the valves is very high and occurs under adverse conditions. For example, the fuel and combustion products are somewhat destructive of the valve contact or seating surfaces in view of the operating rate and the adjacent temperatures. Current tendencies toward the use of pure fuels in internal-combustion engines compound the problem.

To prolong the effective life of the valves in an internal-combustion engine, it has been proposed to provide a casing of hard metal in an annular form at the location of the valve seat. The economy inherent to the application of hard metal by arc-welding techniques suggests such a method; however, several attendant problems have been encountered. Specifically, as the valves for automotive use are relatively small, arc-welding operations tend to produce elevated temperatures in substantial portions of the valves, which may adversely alter the characteristics of the deposited metal as by dilution. In an effort to maintain temperatures at a tolerable level, the hard metal has been applied to the periphery of the valve head with the flat surface of the head engaging a chill plate. Although production valves meet rather rigid specifications for certain dimensions, the flat surface of the head may vary substantially from a true plane. Further deviation results from thermal shock unless heat is effectively controlled. Consequently, in efforts to employ the surface for electrically grounding the valve, intimate contact has been difficult to maintain, resulting in spurious current paths that adversely affect the arc. Also, contact failures produce elevated temperatures in the valve. As a result, the technique of grounding the valve at its flat surface, as to a chill plate, has been found to result in rather unreliable production.

Another problem encountered in applying hard metal to the seating surface of a valve by arc-welding techniques, relates to impurities in the applied hard metal. To attain an improved standard, it is important to avoid any significant defects in the metal, as well as any demarcation at the termination or close of an annular deposit.

Generally, an effective system has been developed for applying the annular deposit; however, prior welding materials left something to be desired in the final results. In general, the present invention relates to an improved system wherein specifically identified materials for the annular deposit result in a substantial and meaningful improvement. The material, including a substantial quantity of iron, may be provided as a fabricated wire using a chromium steel strip to enclose granular components. Such components include an oxidation retardant, e.g., chromium, a stabilizer, e.g., nickel, and a hardener, e.g., carbon and molybdenum.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENT

As required, a detailed illustrative embodiment of the invention is disclosed herein. The embodiment exemplifies the invention which may, of course, be embodied in other forms, some of which may be radically different from the illustrative embodiment as disclosed. However, the specific structural details disclosed herein are representative and they provide a basis for the claims which define the scope of the present invention.

Figure 1:
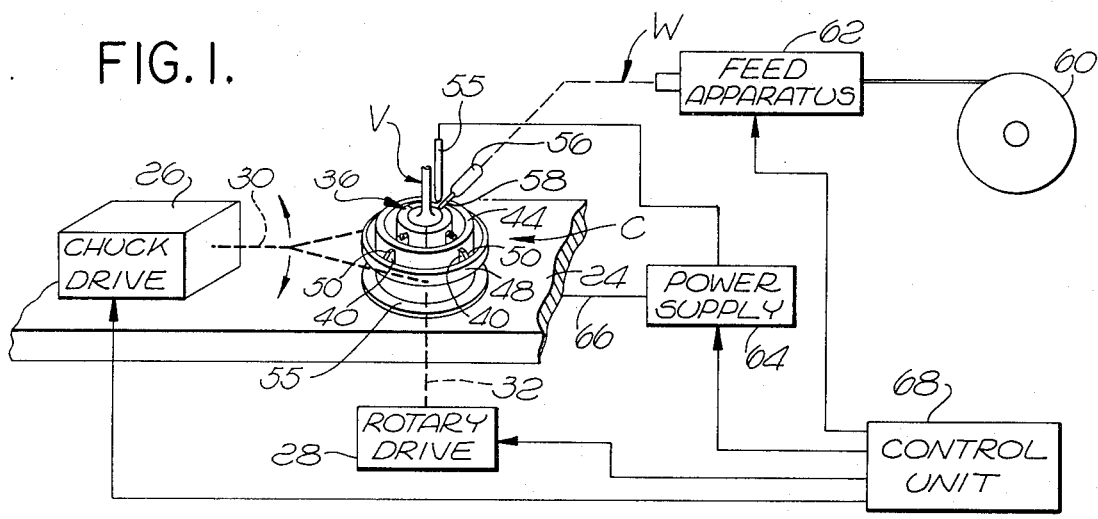
FIG. 1 is a perspective and diagrammatic representation of a system incorporating the principles of the present invention.

Referring initially to FIG. 1, there is shown a valve V supported in a chuck apparatus C and receiving an annulus of hard metal applied by a welding apparatus W. Generally, the chuck apparatus C revolves in relation to the welding apparatus W to rotate the valve V through an angle that is somewhat greater than 360°. During the rotation, the welding apparatus W deposits hard metal while the chuck apparatus C serves as a heat sink and establishes an effective pattern for electrical grounding currents. After the valve V has been rotated through 360°, the size of the molten puddle is gradually reduced until the arc is finally extinguished.

Figure 4:
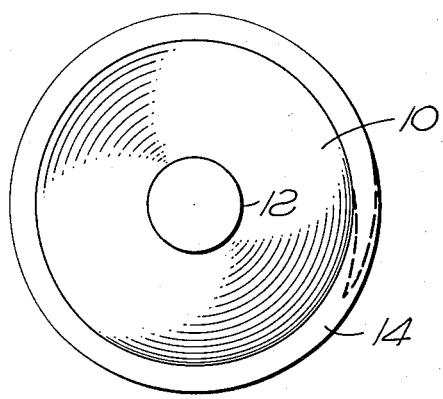
FIG. 4 is a plan view of a valve constructed in accordance herewith.
Figure 5:
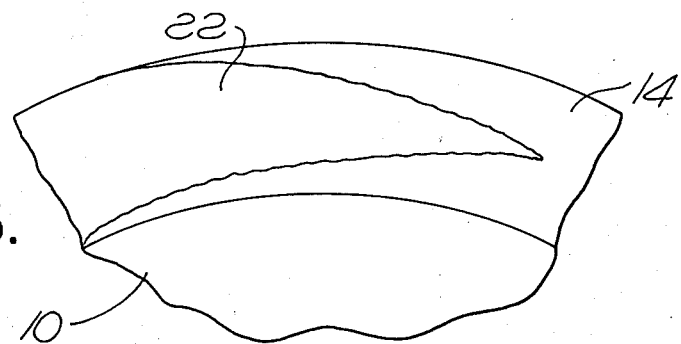
FIG. 5 is a highly enlarged fragmentary and diagrammatic view of the structure of FIG. 4.
Figure 6:
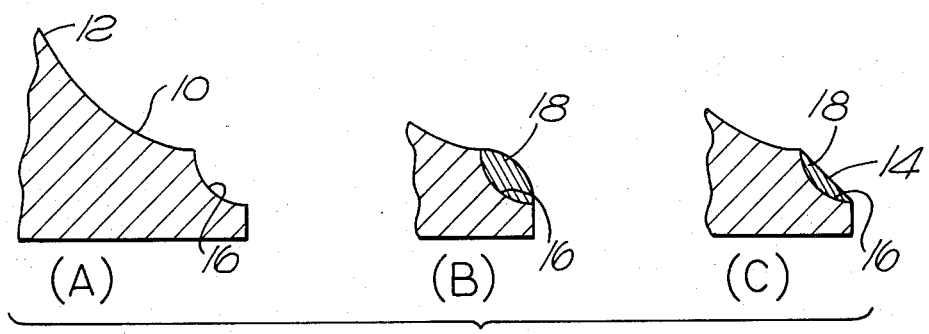
FIG. 6 is a series of fragmentary sectional views illustrative of the production of the completed valve structure of FIG. 4.

Preliminary to considering the system of FIG. 1 in operative detail, some explanation in relation to the valve V will be provided with reference to FIGS. 4, 5 and 6. Valves for internal-combustion engines in the automotive field have become somewhat standardized, and include a valve head 10 (FIG. 4) in the form of a circular disk, with an integral stem 12 extending concentrically from the head. A tapered annular (truncated conical) seating surface 14 is defined at the periphery of the head 10 which comprises hard metal in accordance herewith and, of course, serves to engage a mating surface adjacent an engine port (not shown) in sealing relationship.

Generally, in the formation of a completed valve with the system hereof, a valve blank or form is preliminarily provided defining an annular groove 16 (FIG. 6a). An annulus 18 (FIG. 6b) of hard metal is applied to the groove 16 which is subsequently finished by the removal of a fragment to define the smooth seating surface 14 (FIG. 6c).

In the production of valves, as suggested above, it is exceedingly important to maintain the annulus 18 uniform and substantially free of impurities. In that regard, and in accordance herewith, the annulus 18 is deposited in a specific pattern. That is, the metal is deposited in the groove 16 through one complete rotation of the valve (360° angle) after which the valve continues to be rotated; however, wire feed is halted and the arcing current is substantially reduced. As a consequence, a re-heat pattern 22 as indicated in FIG. 5 is provided whereby defects resulting from shrinkage as well as sharp discontinuities that might otherwise occur at a junction are substantially eliminated.

Reference will now be made to FIG. 1 for a detailed consideration of the system and its operation to accomplish a valve in accordance with the present invention. The chuck apparatus C is supported on a platform 24 (fragmentarily shown) which may comprise a part of a welding bench or a production machine. Mechanical connections from the chuck apparatus C are provided to a chuck actuating drive 26 and a rotary drive 28 as indicated by dashed lines 30 and 32, respectively. Functionally, the chuck actuating drive 26 opens and closes the chuck apparatus C while the rotary drive 28 revolves the chuck apparatus with reference to the head of the welding apparatus W.

Considering the chuck apparatus C in somewhat greater detail, a set of arcuate jaws 34 (FIG. 3) define a cylindrical configuration 36 (FIG. 2) which clampingly receives a valve V by mating engagement at the periphery of the head 10. As disclosed, three jaws 34 are provided, comprising copper (or other high chill material) each extending through an angle of 120°. Upon closure of the jaws 34, the spaces 38 therebetween are closed to provide minimal space therebetween.

In the exemplary machine, the jaws 34 are supported by arms 40 (FIG. 3) that are affixed to extend radially from the external curved surface of each of the jaws. The arms 40 are slidingly received in slots 42 which extend radially through a cylindrical support block 44. Springs 46 are affixed between the internal surface of the support block 44 and each of the jaws 34, thereby urging the jaws outwardly to an "open" configuration.

Movement of the jaws 34 inwardly, to a closed configuration, is accomplished by a ring 48 (FIG. 1) movable in a reciprocating vertical pattern to engage the inclined end surfaces 50 of the arms (FIG. 3) and thereby close the jaws 34. The ring 48, as indicated above, is mechanically coupled to the chuck actuating drive 26 so as to be raised and lowered. Recapitulating, when the ring 48 is raised, the jaws 34 are opened (under the force of the springs 46) to receive a valve. Lowering the ring 48 closes the jaws 34, for mating engagement with the periphery of the valve. It is to be noted, that the valve V is matingly engaged at the periphery 52 (FIG. 2) as well as along the edge of the bottom surface 53 of the head 10 by an annular shoulder 54.

The entire chuck apparatus C (FIG. 1) is mounted for rotation in the platform 24 on a rotary support 55, as on bearings or the like (not shown) to facilitate movement by the rotary drive 28. The chuck apparatus C accordingly rotates the valve V in relation to the welding apparatus W for the deposition of the metal annulus 18. In the illustrative embodiment, the welding apparatus W is a TIG (tungsten arc-inert-gas) apparatus. Accordingly, a nonconsumable electrode 55 is positioned adjacent to the chuck apparatus C along with a wire nozzle 56 for supplying filler wire 58 to the valve V. The wire nozzle 56 receives filler wire from a spool 60 under control of a feed apparatus 62. The feed apparatus 62 incorporates an electric wire-feed motor (not shown) as well known in the prior art. The nonconsumable electrode 55 is connected to a power supply 64 for supplying electrical current to maintain the arc. The power supply is also connected to the chuck apparatus C through a conductor 66 and the platform 24 to accommodate grounding current. The feed motor (not shown) or other wire drive, in the feed apparatus 62 is connected to a control unit 68 which is also connected to the power supply 64, the chuck drive 26, and the rotary drive 28.

In the operation of the system as depicted in FIG. 1, a variety of specific control structures may be employed to accomplish a sequence of operation, which will now be described. Initially, the control unit 68 may have the various operating components in a quiescent state. Specifically, the chuck drive 26 is inoperative with the result that the jaws 34 are open (spaced apart). Furthermore, the feed apparatus 62 is not moving wire nor is the power supply providing electrical current to the electrode 55. Finally, the rotary drive 28 is at standstill so that the chuck apparatus C also is stationary.

Figure 2:
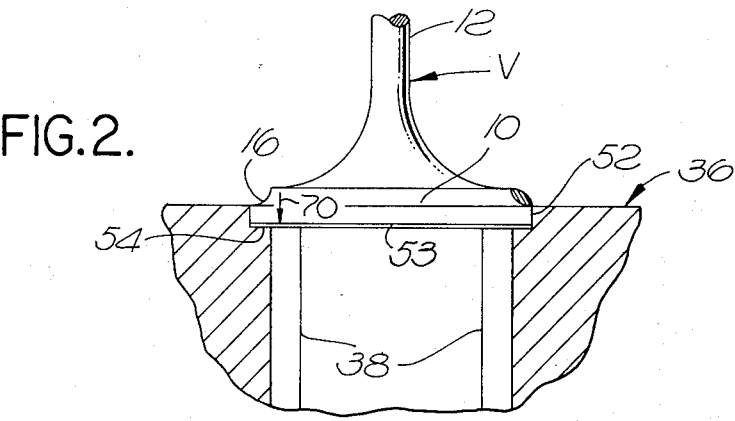
FIG. 2 is a fragmentary vertical section of a component part of the system of FIG. 1.
Figure 3:
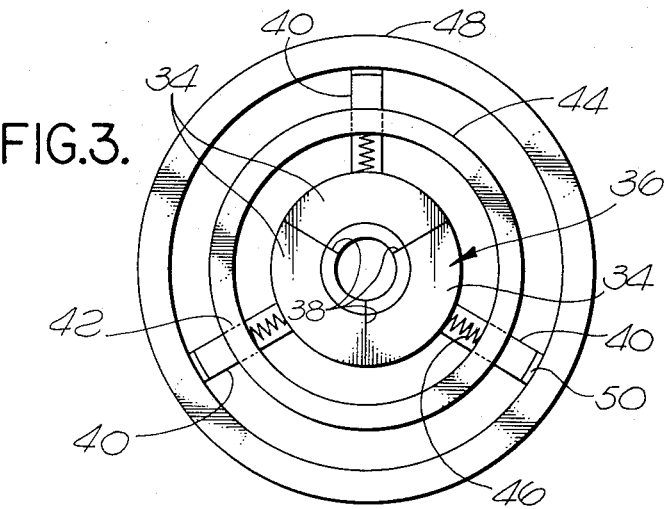
FIG. 3 is a fragmentary horizontal section of a component part of the structure of FIG. 1.

With the components in quiescent states, a valve V is positioned for engagement with the chuck C. The positioning of the valve V may be automated or, of course manual. When the valve V is appropriately positioned, the control unit 68 actuates the chuck drive 26 to lower the ring 48 closing the jaws on the valve V in a positional arrangement as depicted in FIG. 2. Next, the control unit 68 actuates the rotary drive 28 to turn the chuck apparatus C at a substantially constant rate of rotation. Thereafter, the control unit 68 concurrently energizes the power supply 64 and the feed apparatus 62. As a consequence, an arc is established between the tip of the electrode 55 and the valve V while filler wire 58 is continuously supplied to the arc.

As the valve V revolves, hard metal is deposited in the annular groove 16 (FIG. 6a) as explained above. During the application of the hard metal, it is important to recognize that the grounding path for electrical current through the valve V is very short and extends essentially directly under the arc into the configuration 36 (FIG. 1). That is, the short path as indicated by the arrow 70 (FIG. 2) extending from the groove 16 to the cylindrical configuration 36 is representative of one path in a locus of paths about the valve V. Heat flow from the arc follows a somewhat similar path with the result that temperatures developed within the valve V remain well below critical levels.

Upon completion of a revolution (360° rotation) by the chuck apparatus C (FIG. 1) the control apparatus 68 halts the wire feed apparatus 62. Concurrently, the control unit 68 controls the power supply 64 to provide a reduced arc current so that the arc puddle becomes progressively smaller in the overlapped section thereby tapering in the pattern 22 (FIG. 5) as described above to eliminate a junction or shrinkage defects. After a rotation of a substantial overlap, e.g., between five and twenty degrees, the arc current is reduced to a level at which the arc is no longer sustained and accordingly is extinguished. Thereafter, the rotary drive 28 is deenergized by the control unit 68 which then controls the chuck drive 26 to open the jaws 34. At that time, the valve V is released and is, accordingly, removed from the apparatus.

To complete the seating surface 14 (FIG. 6c) the annulus 18 is smoothed or trimmed to provide the desired uniform tapered surface 14. Accordingly, a valve is complete in a construction that will have an effective and prolonged life. Discontinuities are slight, if existent, and a uniform deposit is accomplished.

As indicated above, the form of the wire 58 has been determined to be somewhat critical in the provision of a completely satisfactory valve V. The deposited annulus 18 is to have certain characteristics in accordance herewith which include: resistance to oxidation, a stable structure (as in the face centered lattice), good hardness (cold as well as hot), a wear-resistant characteristic and a low coefficient of friction. In general, the recognition of these characteristics excludes certain components from inclusion in the wire 58. Additionally, the specification is for a material, the components of which are not deemed obvious to formulation in the art.

Figure 7:
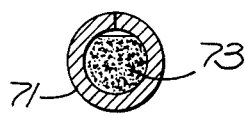
FIG. 7 is a sectional view of the wire of FIG. 1.

It has been found desirable to provide the wire 58 as a fabricated electrode or wire, specifically in the form of a strip that is shaped into an elongate closed tube with a filler therein. Referring to FIG. 7, the wire 58 is illustrated to include a cylindrical tube 71 containing a filler 73. Techniques for forming such a wire are well known in the prior art, as disclosed for example in U. S. Pat. No. 3,534,390 by the present inventors.

The cylindrical tube 71 may comprise various steels and iron alloys; however, in specific systems of the present invention chromium steels have been employed. In one successful system, the strip forming the tube 71 comprises AISI chromium steel Type Number 405, specified as containing between 11.50 and 14.50 percent (by weight) of chromium with limited amounts of the elements: C, Mn, Si, P, and S.

The filler 73 is also subject to substantial variation; however, an all-weld deposit has been discovered that provides the desired characteristics set forth above. Specifically, for a ferro-alloy, resistance to oxidation is provided by a substantial quantity of chromium, e.g., in a range between about 18 and 28 percent by weight. A quantity of nickel is provided to stabilize the face centered lattice (affording a stable structure) and in that regard quantities in the range between 8 and 13 percent by weight have been determined to be satisfactory.

Desired hardness characteristics for the alloy include a specification of a minimum of 230 Brinell at a temperature of 1,200° F. Carbon and molybdenum are employed in accordance herewith to promote such a characteristic. Specifically, at least 4 percent by weight of molybdenum has been determined to be important, and an amount of carbon between 1 and 5 percent by weight. Wear resistance is provided by carbides. It is also noteworthy that the importance of a low coefficient of friction eliminates so-called "soft" structures as possibilities.

One specific form of deposit for the annulus 18 that has been determined to be particularly effective has an all-weld deposit analysis in components by weight, as follows:

| | |
|---|---|
| Carbon | 2.3% |
| Silicon | 0.9% |
| Chromium | 25.2% |
| Nickel | 10.5% |
| Molybdenum | 5.5% |
| Iron | remainder |

The deposit of an annulus 18 specified above results from using a wire 58 specified in weight percentages as follows:

| | |
|---|---|
| Nickel powder | 10.0% |
| Ferro Molybdenum | 8.0% |
| H. C. Chromium metal | 21.0% |
| Ferro Silicon | 1.0% |
| Steel Strip (405) | 60.0% |

The steel strip, as indicated in the form of standard 405, is fabricated as the tube 71 (FIG. 7) with a filler 73 consisting of the other specified components.

Valves V completed in accordance herewith and employing the exemplary annulus 18 as specified above have been determined to effectively attain the desired characteristics. Consequently, valves V may be completed for use in engines of current production (e.g., for using lead-free fuel) in an effective, economical and reliable manner. Of course, various deviations are practical within the scope hereof and as a consequence the claims set forth below are deemed to define the present invention.

What is claimed is:

1. A method of producing a valve, as for use in an internal-combustion engine, comprising the steps of:
   providing a valve form including a stem and a head, said head defining an annular groove at the periphery thereof;
   supporting said valve form by matingly engaging said head at the periphery thereof, to provide effective electrical contact about said periphery;
   establishing an arc-welding current path through an electrode and said valve form, as supported;
   employing said current path to deposit an annulus of weld metal on said annular groove from a material comprising substantially a substantial portion of iron and further including an oxidation retardant, a stabilizer, and a hardener; and
   finishing said valve including smoothing said annulus of deposited metal.

2. A method according to claim 1 wherein said valve is rotated about the central axis thereof during the deposition of said annulus of metal.

3. A method according to claim 1 wherein said iron comprises over fifty percent by weight of said material and said oxidation retardant comprises chromium, said stabilizer comprises nickel, and said hardener is a component selected from the group consisting of carbon and molybdenum.

4. A method according to claim 1 wherein said material comprises substantially by weight about 60 percent chromium steel, about 10 percent nickel, about 20 percent chromium and about 10 percent alloying ingredients.

5. A method according to claim 4 wherein said alloying ingredients comprise ferro molybdenum and ferro silicon.

6. A method according to claim 4 wherein said steel is present in said material as an enclosing sheath for said nickel, chromium and alloying ingredients.

7. A method according to claim 1 wherein said weld metal has a minimum hardness of 230 Brinell at a temperature of 1,200° F.

* * * * *